(12) United States Patent
Omiya et al.

(10) Patent No.: US 7,483,069 B2
(45) Date of Patent: Jan. 27, 2009

(54) LENS BARREL, IMAGING DEVICE AND OPTICAL DEVICE

(75) Inventors: Akio Omiya, Saitama (JP); Satoru Horikoshi, Saitama (JP); Masaaki Orimoto, Saitama (JP); Yoshihiro Ito, Saitama (JP)

(73) Assignees: Fujinon Corporation, Saitama (JP); FUJIFILM Corporation, Tokyo (JP)

( * ) Notice: Subject to any disclaimer, the term of this patent is extended or adjusted under 35 U.S.C. 154(b) by 523 days.

(21) Appl. No.: 11/339,559

(22) Filed: Jan. 26, 2006

(65) Prior Publication Data

US 2006/0164537 A1    Jul. 27, 2006

(30) Foreign Application Priority Data

Jan. 26, 2005    (JP) .............................. 2005-018141

(51) Int. Cl.
*H04N 5/225* (2006.01)
(52) U.S. Cl. ........................ 348/335; 348/357; 359/822; 359/819
(58) Field of Classification Search ................. 348/340, 348/373, 374, 375, 376; 359/823, 824, 694
See application file for complete search history.

(56) References Cited

U.S. PATENT DOCUMENTS

| 5,220,461 | A | * | 6/1993 | Inoue et al. | 359/824 |
| 5,691,854 | A | * | 11/1997 | Yoshida et al. | 359/823 |
| 5,768,038 | A | * | 6/1998 | Emura | 359/824 |
| 5,859,733 | A | * | 1/1999 | Miyano et al. | 359/824 |
| 6,829,011 | B1 | * | 12/2004 | Higuchi et al. | 348/340 |

FOREIGN PATENT DOCUMENTS

JP    9-211287 A    8/1997

* cited by examiner

*Primary Examiner*—Tuan Ho
*Assistant Examiner*—Quang V Le
(74) *Attorney, Agent, or Firm*—Sughure Mion, PLLC

(57) ABSTRACT

A lens frame is contained in a lower lens barrel and moves in a direction of an optical axis as guided by a guide shaft. An adjusting lever is provided with a lever body having a bearing for supporting the lower end of the guide shaft and an opening into which an adjusting pin is inserted, and a holding portion extended from near the opening of the lever body to outside the lower lens barrel. A length between an edge of the holding portion and a center of the opening is longer than the length between the center of the opening and a center of the bearing. The lever moves around the adjusting pin in a plane orthogonal to the optical axis to adjust the position of the guide shaft.

9 Claims, 8 Drawing Sheets

LENS BARREL, IMAGING DEVICE AND OPTICAL DEVICE

BACKGROUND OF THE INVENTION

1. Field of the Invention

The present invention relates to a lens barrel having a guide shaft for guiding a lens to move, and an imaging device and an optical device that are provided with the lens barrel.

2. Background Arts

Widely used recently is a digital camera as an imaging device, which has an imaging element to image a subject focused thereon by an imaging optical system and stores image data obtained by the imaging element in a storage medium such as a memory card and the like.

Since the digital camera is often used outdoors, it is desired for it to be slim and compact. In order to improve portability, the digital camera disclosed in, for example, Japanese Patent Laid-Open Publication Number 9-211287 is downsized by using a lens barrel with a reflection member for refracting a subject light in an approximately orthogonal direction in the imaging optical system to keep a length necessary for focusing the subject light therein. This lens barrel is constituted of a barrel body and the imaging optical system. The imaging optical system performs, for instance, focusing by moving a lens, which constitutes a part of the imaging optical system, in a direction of an optical axis. The barrel body is provided with a guide shaft therein for guiding the lens to move back and forth in the direction of the optical axis.

However, it is hard to adjust the position of the guide shaft according to Japanese Patent Laid-Open Publications Number 9-211287, since the guide shaft is disposed in the barrel body.

SUMMARY OF THE INVENTION

An object of the present invention is to provide a lens barrel having a guide shaft for guiding a lens to move, in which the position of the guide shaft can be easily adjusted, and an imaging device and an optical device that are provided with the lens barrel.

In order to achieve the above and other objects, in a lens barrel of the present invention, one end of a guide shaft for guiding a lens to move is supported by a movable lever. The lever moves around an adjusting pin, which is fixed to the barrel body, to adjust the position of the guide shaft.

The guide shaft is disposed inside the barrel body. The lever has a lever body and a holding portion. The lever body is formed with an opening, and a bearing for supporting the end of the guide shaft. The holding portion is extended from near the opening to outside the barrel body. The holding portion is operated from outside of the barrel body to adjust the position of the guide shaft. The length between an edge of the holding portion and a center of the opening is longer than that between the center of the opening and a center of the bearing. The adjusting pin is fixed to the barrel body through the opening.

According to a preferable embodiment of the present invention, the opening has a shape elongated along the longitudinal direction of the lever body, whose width is approximately equal to the diameter of the adjusting pin. Moreover, a cutout is formed on the holding portion such that the holding portion can be easily broken off on the cutout after the position of the guide shaft is adjusted.

A thread portion is formed at the top of the adjusting pin such that the adjusting pin is threaded in a screw hole formed on the barrel body. A flange portion is formed on the adjusting pin between the thread portion and a head of the pin. The lever is biased toward the barrel body by a spring provided between the flange portion and the lever.

The lens barrel has a detecting device for optically detecting the position of the lens. The detecting device is directly attached to the lever, or indirectly fixed to the lever through a supporting member.

The imaging device of the present invention is provided with the above lens barrel and an imaging element to image a subject. Moreover, the imaging device is provided with a fixing member for fixing the imaging element to the barrel body. The fixing member is supported by the adjusting pin. Furthermore, the optical device of the present invention is provided with the above lens barrel.

According to the lens barrel of the present invention, it is possible to easily adjust the position of the guide shaft by holding and moving the holding portion protruding outside from the barrel body. Since the length between the edge of the holding portion and the center of the opening is formed to be longer than that between the center of the opening and the center of the bearing, the guide shaft moves less than the edge of the holding portion, which enables the guide shaft to be finely adjusted.

Since the opening is elongated along the longitudinal direction of the lever body and has the width that is approximately equal to the diameter of the adjusting pin, the lever is movable around the adjusting pin and in the longitudinal direction thereof. Owing to this, the lever is prevented from moving in other directions, thereby facilitating the adjustment of the position of the guiding shaft.

In addition, since the holding portion can be broken off on the cutout after the guide shaft is adjusted its position, it can prevent the lever from protruding from the barrel body after the position adjustment.

Furthermore, since the detecting device moves together with the lever when the lever is moved, a light shielding member formed on a lens frame and the detecting device are prevented from interrupting each other.

BRIEF DESCRIPTION OF THE DRAWINGS

One with ordinary skill in the art would easily understand the above-described objects and advantages of the present invention when the following detailed description is read with reference to the drawings attached hereto.

PREFERRED EMBODIMENTS OF THE INVENTION

Figure 1:
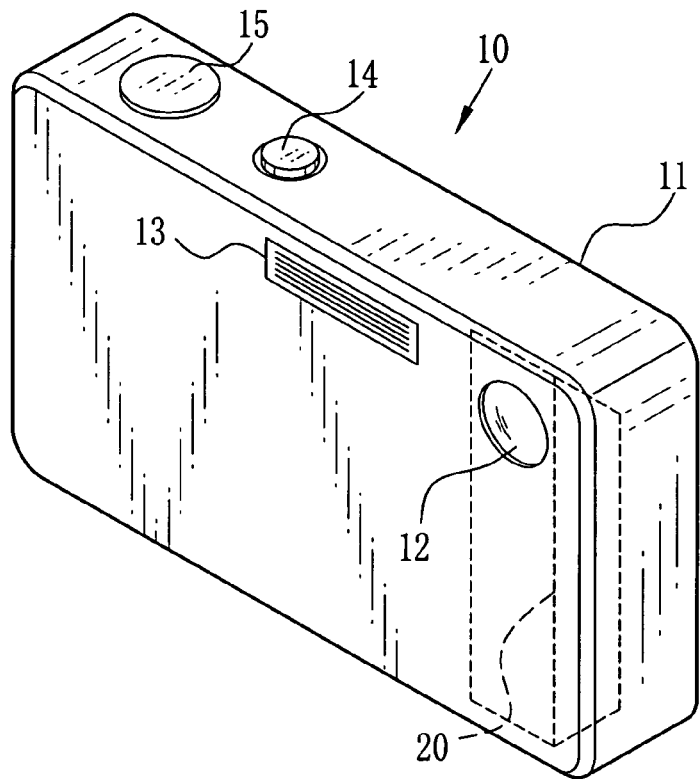
FIG. 1 is a perspective view illustrating a digital camera viewed from a front side.
Figure 2:
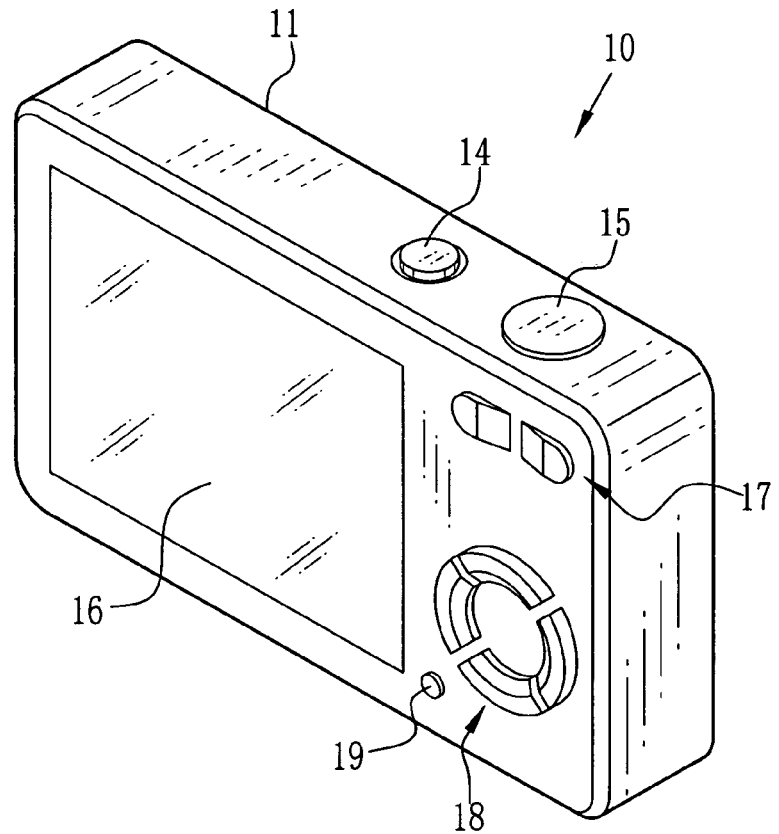
FIG. 2 is a perspective view illustrating the digital camera viewed from a rear side.

As shown in FIG. 1, a digital camera 10 comprises a camera body 11 having a front lens 12 and a flash light emitting portion 13 on the front surface thereof and a power switch 14 and a shutter button 15 on the top surface thereof. The camera body 11 is provided with a liquid crystal display (LCD) 16, zooming buttons 17, cursor buttons 18, and a mode selection button 19 on the rear surface thereof, as shown in FIG. 2. The mode selection button 19 is operated by a user to select a mode among an imaging mode for recording an image in a memory card, a reproduction mode to reproduce the image recorded in the memory card, and a setup mode for various setting.

Other than reproducing the image, the LCD 16 is also used as ail electric view finder to display a through image for framing. The LCD 16 also displays a menu screen when the setup mode is selected. The cursor buttons 18 are operated to move a cursor to select an item on the menu screen. The zooming buttons 17 are operated for zooming. A lens barrel 20 having the front lens 12 is incorporated in the camera body 11.

Figure 3:
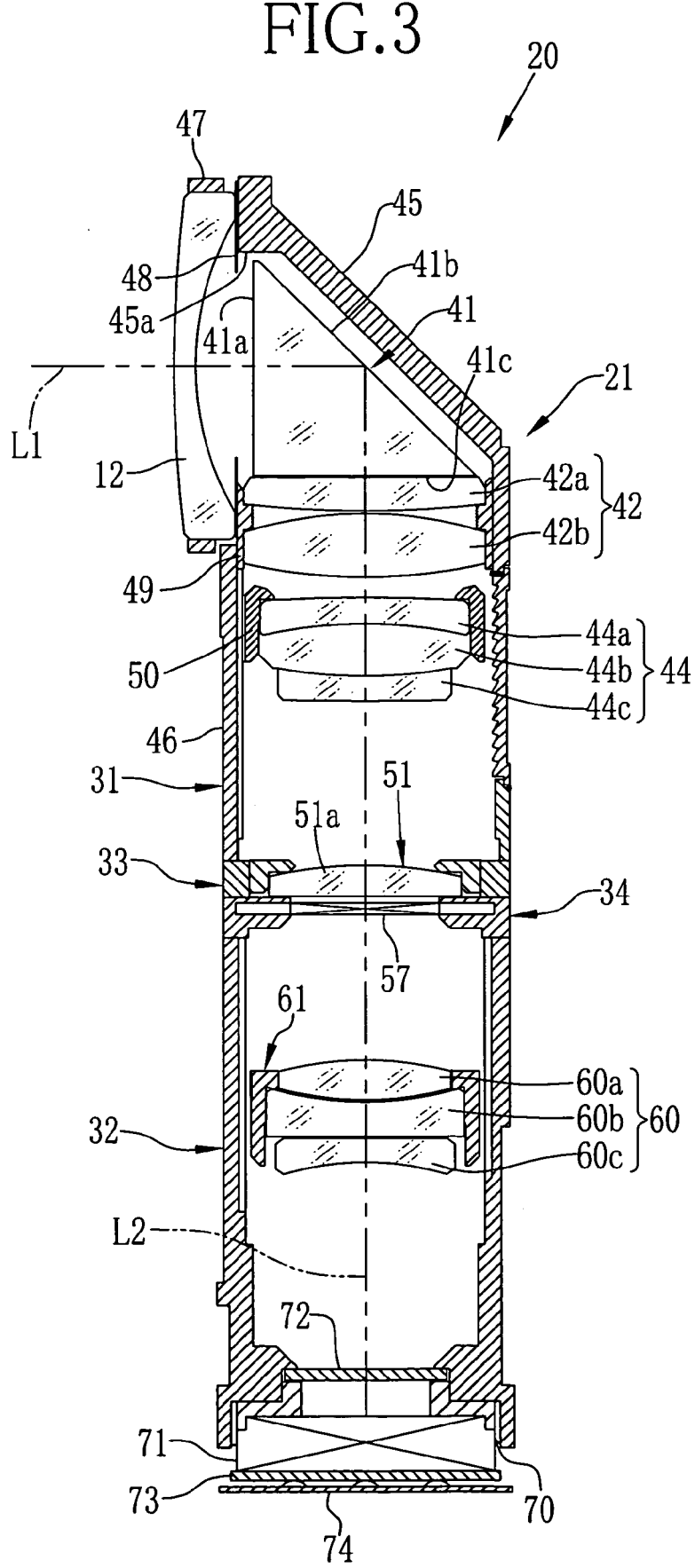
FIG. 3 is a cross-sectional view illustrating a lens barrel viewed from a lateral side.
Figure 4:
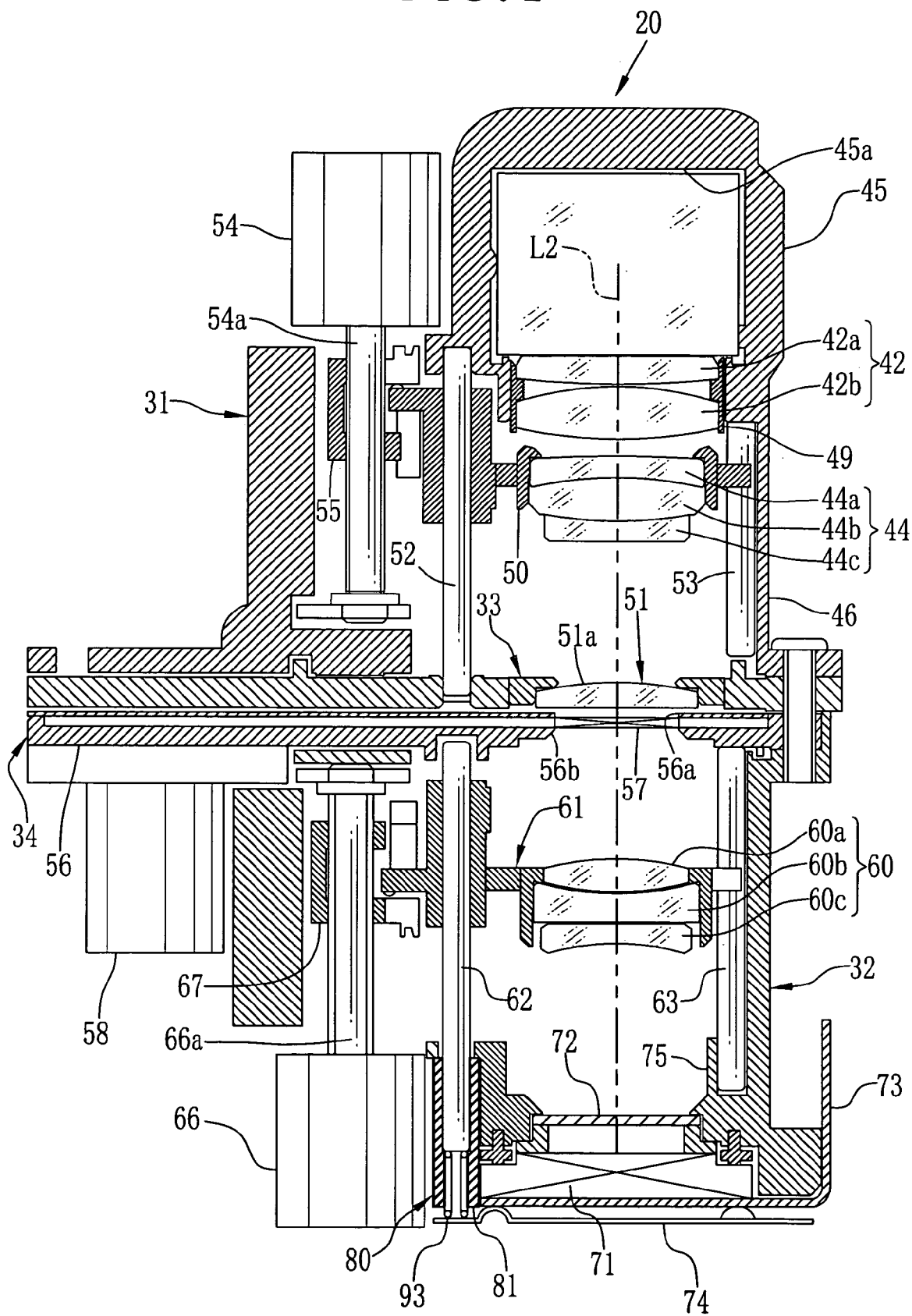
FIG. 4 is a cross-sectional view illustrating the lens barrel viewed from the front side.

As shown in FIG. 3 and FIG. 4, the lens barrel 20 has a barrel body 21 in which various parts are incorporated. The barrel body 21 comprises an upper barrel 31, a lower barrel 32, and a lens supporting plate 33 and a shutter unit 34 that are disposed between the upper barrel 31 and the lower barrel 32.

The upper barrel 31 supports a first lens group constituted of the front lens 12 and a rear lens group 42, and a second lens group 44. The upper barrel 31 has a prism containing portion 45 formed of a frame having a triangle section, and a lens containing portion 46 formed of a frame having a rectangular section under the prism containing portion 45.

A lens frame 47 for supporting the front lens 12 is attached in front of the prism containing portion 45, and an opening 45a is formed behind the front lens 12. The opening 45a has a rectangular shape which is wider than its height. A light shielding mask 48 is provided between the front lens 12 and the opening 45a, for blocking the light from above the opening 45a which adversely affects a captured image.

A rectangular prism 41 in the shape of a triangle pole is contained in the prism containing portion 45 behind the front lens 12. The rectangular prism 41 has an incident surface 41a facing the front lens 12 for allowing a subject light transmitted through the front lens 12 to enter, a reflecting surface 41b arranged to make an acute angle with the incident surface 41a for reflecting the subject light from the incident surface 41a into a direction approximately perpendicular thereto, and an exit surface 41c arranged perpendicular to the incident surface 41a for allowing the subject light reflected on the reflecting surface 41b to exit from the rectangular prism 41.

The subject light transmitted through the front lens 12 enters the rectangular prism 41 at an angle perpendicular to the incident surface 41a and refracted to approximately 90 degrees by the reflecting surface 41b, and then exits from the rectangular prism 41 via the exit surface 41c at the angle perpendicular thereto. That is, the rectangular prism 41 deflects an optical axis L1 of the front lens 12 into an optical axis L2, which is approximately perpendicular to the optical axis L1.

The lens containing portion 46 contains, the rear lens group 42 and the second lens group 44, which are disposed on the optical axis L2. The rear lens group 42 has two lenses 42a and 42b, and is supported by a lens frame 49. The lens frame 49 is fixed in the lens containing portion 46 under the exit surface 41c of the rectangular prism 41. The second lens group 44 has three lenses 44a, 44b and 44c, and is supported by a lens frame 50.

The second lens group 44 is zooming lenses, and moves back and forth along the optical axis L2. The lens supporting plate 33 is disposed at the bottom of the upper barrel 31 below the second lens group 44 to support a third lens group 51. The third lens group 51 has a lens 51a, and is disposed to face the second lens group 44. Two guide shafts 52, 53 are disposed parallel to the optical axis L2 in the lens containing portion 46 for guiding the second lens group 44 to move in the direction of the optical axis L2. One end of each guide shaft 52, 53 is supported by the lens containing portion 46, while other end is supported by the lens supporting plate 33. The guide shafts 52, 53 thus support the lens frame 50 movably in the direction of the optical axis L2.

A motor 54 is provided next to the prism containing portion 45 and a rotary shaft 54a of the motor 54 is disposed parallel to the optical axis L2. A screw 55 is threadably mounted on the rotary shaft 54a and prevented from rotating. Thereby, when the rotary shaft 54a is rotated by the motor 54, the screw 55 moves along the rotary shaft 54a, which is parallel to the optical axis L2. The screw 55 engages with the lens frame 50, thus the lens frame 50 moves along the optical axis L2 when the screw 55 moves.

The motor 54 is a stepping motor, and the original position of the lens frame 50 is detected by a photointerrupter (hereinafter, referred to as PI) 69 as an optical position detecting device (see FIG. 8), to control the position of the second lens group 44 based on a detecting signal. Zooming is performed by changing the distance between the second lens group 44 and a fourth lens group 60 on the optical axis L2. Note that the motor 54 can be a DC motor, and in that case an encoder is provided for controlling the position of the second lens group 44.

The shutter unit 34 has a unit body 56 and a motor 58, and disposed under the lens supporting plate 33. A shutter device 57 having an aperture stop function is provided in the unit body 56, and the unit body 56 has openings 56a and 56b facing the third lens group 51 and the fourth lens group 60, respectively. The shutter device 57 has a pair of shutter blades facing each other, and is driven by a motor 58. The shutter device 57 controls the amount of the subject light to pass through the openings 56a and 56b, that is, the amount of the subject light to enter the fourth lens group 60. Note that the motor 58 can be the stepping motor or the DC motor.

The lower barrel 32 contains the fourth lens group 60. The fourth lens group 60 has three lenses 60a, 60b and 60c, and is supported by a lens frame 61. In the lower barrel 32, two guide shafts 62, 63 for guiding the movement of the fourth lens group 60 are disposed parallel to the optical axis L2. The fourth lens group 60 is focusing lenses, and the lens frame 61 is supported by the guide shafts 62, 63 movably along the optical axis L2.

A motor 66 is provided next to the lower barrel 32 such that a rotary shaft 66a thereof is parallel to the optical axis L2. A screw 67 is threadably mounted on the rotary shaft 66a and prevented from rotating. Thereby, when the rotary shaft 66a is rotated by the motor 66, the screw 67 moves along the rotary shaft 66a, which is parallel to the optical axis L2. The screw 67 engages with the lens frame 61, thus the lens frame 61 moves along the optical axis L2 when the screw 67 moves.

Figure 5:
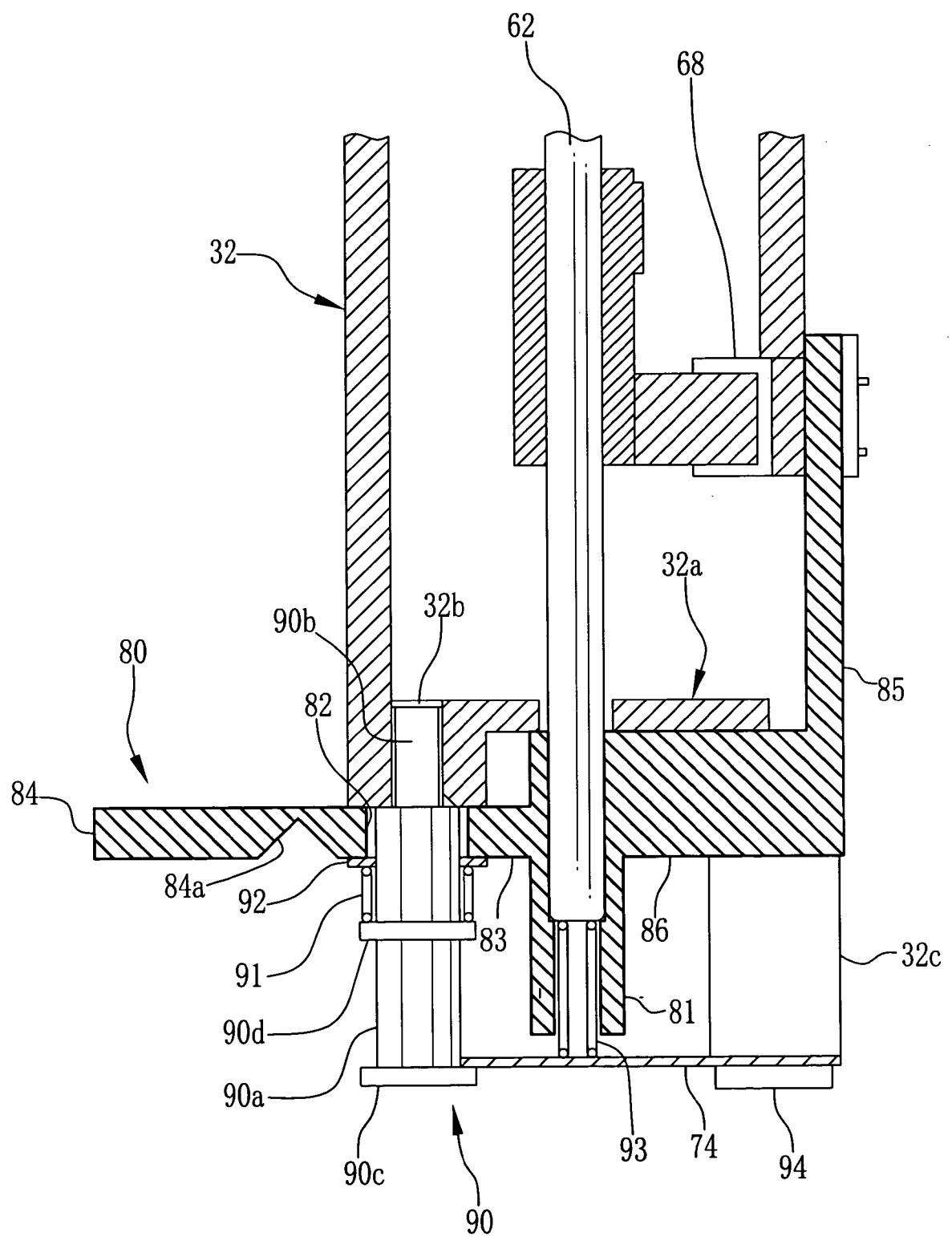
FIG. 5 is a cross-sectional view illustrating compositions of an adjusting lever and its vicinity.

The motor 66 is a stepping motor as well as the motor 54. As shown in FIG. 5, a PI 68, which is the optical position detecting device, is disposed in the rear side of the lower barrel 32. The original position of the lens frame 61 is detected by the PI 68 and the position of the fourth lens group 60 is controlled based on the detecting signal. After the zooming, the fourth lens group 60 moves in the direction of the optical axis L2 to focus on the subject. Note that the motor 66 can be a DC motor, and in that case an encoder is provided for controlling the position of the fourth lens group 60.

A containing portion 70 is formed at the bottom of the lower barrel 32. The containing portion 70 contains a CCD image sensor (hereinafter abbreviated to CCD) 71. An optical lowpass filter 72 is disposed in front of the CCD 71 below the fourth lens group 60. The CCD 71 is mounted on an FPC 73, which is a flexible circuit board. A leaf spring 74 is disposed below the lower barrel 32 for biasing the CCD 71 via the FPC 73, such that the CCD 71 is secured in the containing portion 70. Although the CCD 71 is used as the imaging element, other devices such as, for example, a CMOS image sensor is also applicable in the present invention.

The lower end of the guide shaft 63 is supported by a boss 75 formed in the lower barrel 32, while the lower end of the guide shaft 62 is supported by an adjusting lever 80 attached to the lower barrel 32.

Figure 6:
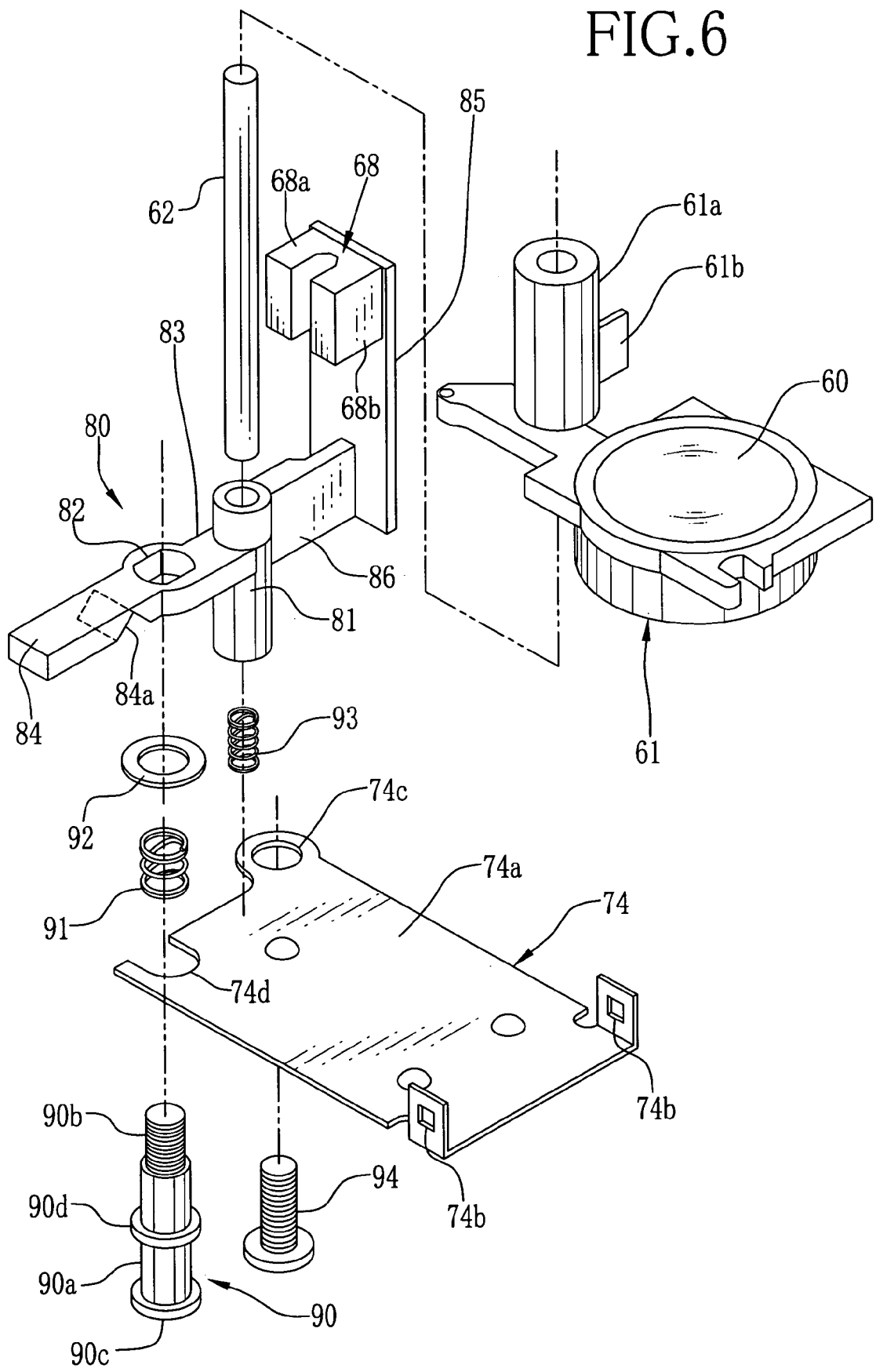
FIG. 6 is an exploded perspective view illustrating compositions of the adjusting lever and its vicinity.

The following description explains about a composition of the adjusting lever 80. As shown in FIG. 5 and FIG. 6, the adjusting lever 80 is composed of a lever body 83 having a boss (bearing) 81 for supporting the bottom of the guide shaft 62 and an opening 82 into which an adjusting pin 90 is inserted, and a holding portion 84 extended from near the opening 82 to outside the lower barrel 32.

In addition, a supporting plate 85 for supporting the PI 68, and a connecting portion 86 for connecting the lever body 83 and the supporting plate 85, are integrally formed with the adjusting lever 80. A cutout 84a is formed on the holding portion 84 at the position next to the front surface of the lower barrel 32. The cutout 84a has a v-shaped cross section perpendicular to the longitudinal direction of the holding portion 84. It is thus possible to easily break off the holding portion 84 on the cutout 84a.

Figure 7:
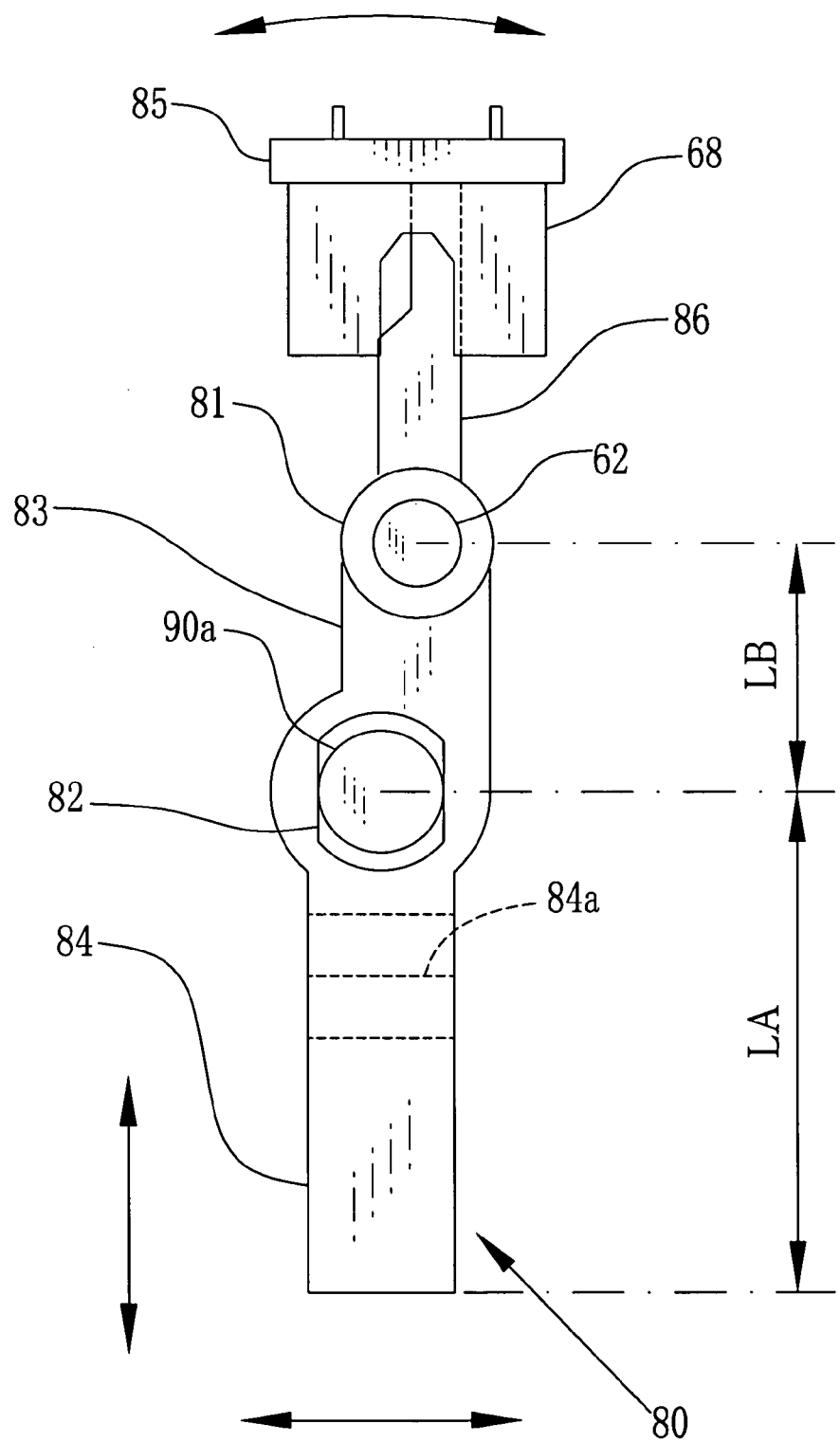
FIG. 7 is a plane view illustrating the adjusting lever.

The opening 82 is elongated along the longitudinal direction of the lever body 83 and has the width approximately equal to the diameter of a pin body 90a of the adjusting pin 90. As shown in FIG. 7, a length LA between the edge of the holding portion 84 and the center of the opening 82 is longer than a length LB between the center of the opening 82 and the center of the boss 81.

A thread portion 90b is formed at the top end of the adjusting pin 90, while a pin head 90c having a cross-shaped groove is formed at the bottom end thereof. A flange portion 90d is formed between the thread portion 90b and the pin head 90c. In order to attach the adjusting lever 80 to the lower barrel 32, the thread portion 90b is inserted into a spring 91 and a washer 92, and then into the opening 82. A supporting portion 32a for supporting the adjusting lever 80 is formed at the bottom of the lower barrel 32, and the adjusting pin 90 is secured to the supporting portion 32a when the thread portion 90b is threaded in a screw hole 32b formed on the supporting portion 32a.

The adjusting lever 80 is biased toward the supporting portion 32a by the spring 91 disposed between the adjusting lever 80 and the flange portion 90d formed on the pin body 90a. In addition, the spring 93 is inserted into the boss 81, and the bottom of a spring 93 is supported by an upper surface 74a of the leaf spring 74. Accordingly, the adjusting lever 80 is biased to the supporting portion 32a by the spring 93, such that upper surfaces of the boss 81 and the connecting portion 86 contact the supporting portion 32a. Thereby, the adjusting lever 80 is supported to move around the adjusting pin 90 in a plane orthogonal to the optical axis L2. Since the opening 82 is elongated and has the approximately same width as the diameter of the pin body 90a, the adjusting lever 80 is prevented from moving in the direction perpendicular to the longitudinal direction of the lever body 82.

Formed on the leaf spring 74 are two engaging holes 74b for engaging with projections (not shown) on a lateral side of the lower barrel 32, a hole 74c into which a screw 94 is inserted, and a cutout 74d. In order to attach the leaf spring 74 to the lower barrel 32, two engaging holes 74b are engaged with the projections, and then the screw 94 is inserted into the hole 74c to be threaded in the boss 32c at the bottom of the lower barrel 32. Then, the adjusting pin 90 is fitted in the cutout 74d, and the leaf spring 74 is thus supported to cover the bottom of the lower barrel 32.

The PI 68 is provided with a light emitting section 68a and a light receiving section 68b and outputs a detecting signal when the light from the light emitting section 68a is blocked between the light emitting section 68a and the light receiving section 68b. A boss 61a into which the guide shaft 62 is inserted is formed on the lens frame 61, and a light shielding plate 61b is provided on the boss 61a. When the lens frame 61 returns to the original position, it blocks the light from the light emitting section 68a toward the light receiving section 68b.

Figure 8:
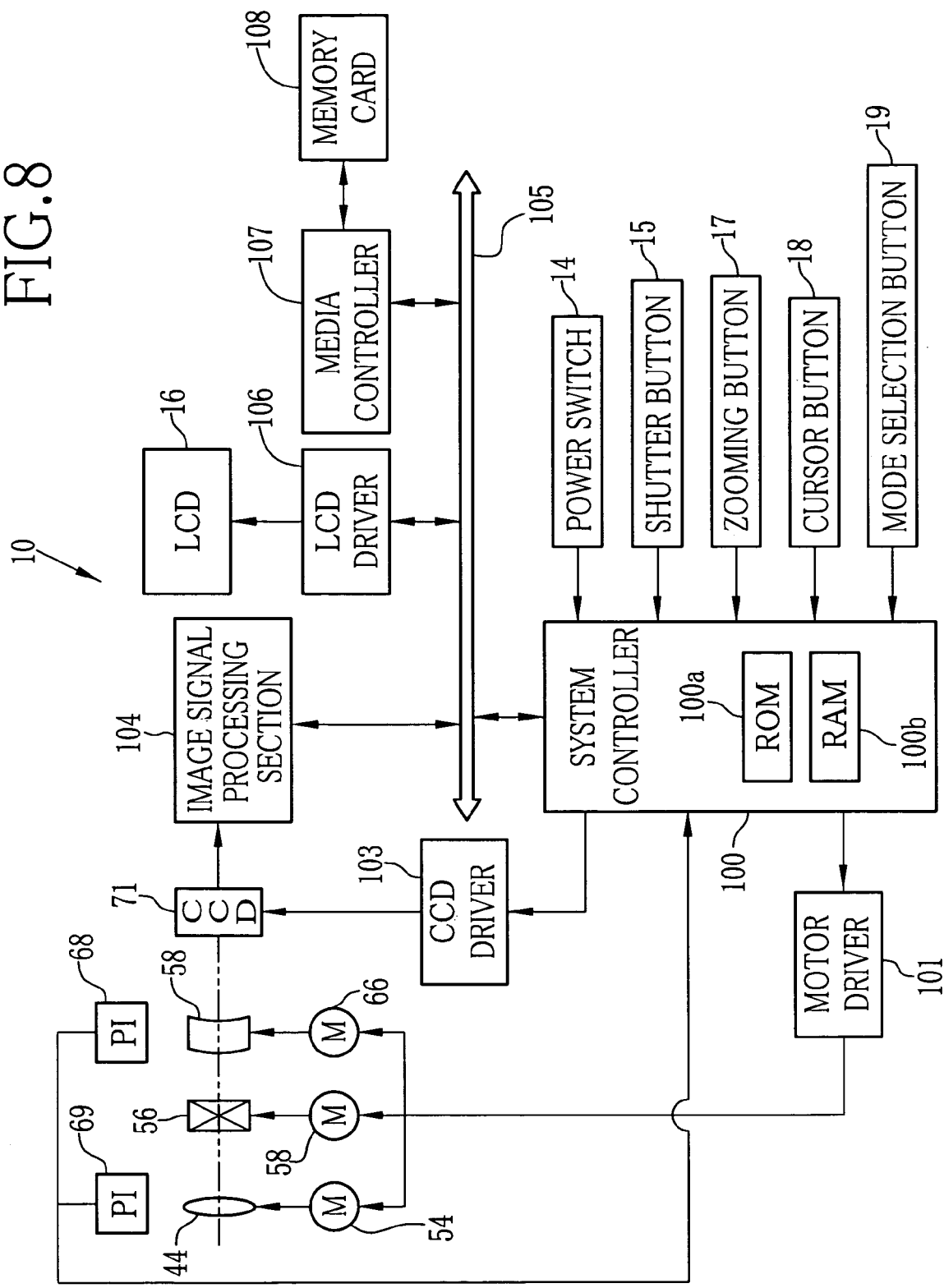
FIG. 8 is a block diagram illustrating an electronic composition of the digital camera.

As shown in FIG. 8, the digital camera 10 is provided with a system controller 100 that controls the whole of the camera. The system controller 100a is provided with a ROM 100a that stores a program for controlling various components, and a RAM 100b that temporarily stores working data.

The system controller 100 is connected to the motors 54, 58 and 66 via a motor driver 101, and controls the motor driver 101 to drive the motors 54, 58 and 66. Thereby, the motor 54 or 66 moves the second lens group 44 or the fourth lens group 60, in the direction of the optical axis L2, while the motor 58 drives the shutter device 57.

In addition, the system controller 100 is connected to the PI 68 and PI 69 for detecting the original positions of the fourth lens group 60 and the second lens group 44, and controls the motors 66 and 54 in accordance with the detecting signals from the PI 68 and PI 69.

The system controller 100 is connected to the CCD 71 via the CCD driver 103. The system controller 100 drives the CCD 71 by controlling the CCD driver 103. The CCD 71 photoelectrically converts the subject image into an electric signal. In addition, the CCD 71 is connected to an image signal processing section 104 to output the image signal thereto. The image signal processing section 104 is connected to the system controller 100 via a data bus 105, and is controlled by the system controller 100.

The image signal processing section 104 is composed of a correlation double sampling circuit (CDS), an amplifier (AMP), an A/D converter, a signal processing circuit, a memory, a compression/decompression circuit and the like. The CDS removes noise from the image signal from the CCD 71. The AMP amplifies the image signal, after the noise is removed therefrom, and outputs the image data to the A/D converter. The A/D converter converts the amplified image signal into the image data of digital form and then outputs it to the signal processing circuit.

The signal processing circuit carries out image processes such as gradation correction, white balance correction, and γ correction, and YC conversion process to the image data. Simplified imaging process and simplified YC conversion process are carried out to the image data inputted in the image signal processing section 104 before capturing in the imaging mode, and then the image data is outputted to an LCD driver 106. The system controller 100 controls the LCD driver 106 to display the through image on the LCD 16.

In capturing, the imaging process, the YC conversion process, and a compression process in such as JPEG form are carried out to the image data inputted in the image signal processing section 104. The system controller 100 controls a media controller 107 to store the compressed image data in a memory card 108. In the reproducing mode, a decompression process is carried out to the image data stored in the memory card 108 and the decompressed image is displayed on the LCD 16 as a reproduced image.

The system controller 100 is connected to the power switch 14, the shutter button 15, the zooming buttons 17, the cursor buttons 18, and the mode selection button 19, and obtains signals from them to carry out corresponding processes.

The following description explains about the functions of the lens barrel 20. The adjusting lever 80 is supported by the lower barrel 32 to be movable around the adjusting pin 90 in the plane orthogonal to the optical axis L2. The adjusting lever 80 thus rotates around the adjusting pin 90 when the holding portion 84 is moved from side to side, as shown in FIG. 7. The position of the guide shaft 62 can be finely adjusted, since the distance LA between the edge of the holding portion 84 and the center of the opening 82 is longer than the distance LB between the center of the opening 82 and the center of the boss 81 so that the guide shaft 62 moves less than the holding portion 81.

Since the opening 82 is elongated along the longitudinal direction of the lever body 83, it is possible to adjust the position of the guide shaft 62 by moving the holding portion 81 in the longitudinal direction.

The adjusting lever 80 is limited to move in the direction perpendicular to the longitudinal direction because the opening 82 has the width that is approximately equal to the diameter of the pin body 90a of the adjusting pin 90. Accordingly, the adjusting lever 80 moves only in the longitudinal direction and rotates around the adjusting pin 90, thus the position of the guide shaft 62 can be adjusted easily.

In addition, since the PI 68 is supported by the supporting plate 85, which is integrally formed with the adjusting lever 80, the PI 68 moves integrally with the adjusting lever 80. It can be thus prevented that the light shielding plate 61b and the PI 68 interferes with each other when the guide shaft 68 moves.

Furthermore, the holding portion 84 can be broken off on the cutout 84a after the position of the guide shaft 62 is adjusted, such that the adjusting lever 80 does not protrude from the barrel body 21. Accordingly, the adjusting lever 80 does not trouble the operation to mount the lens barrel 20 in the digital camera 10.

Figure 9:
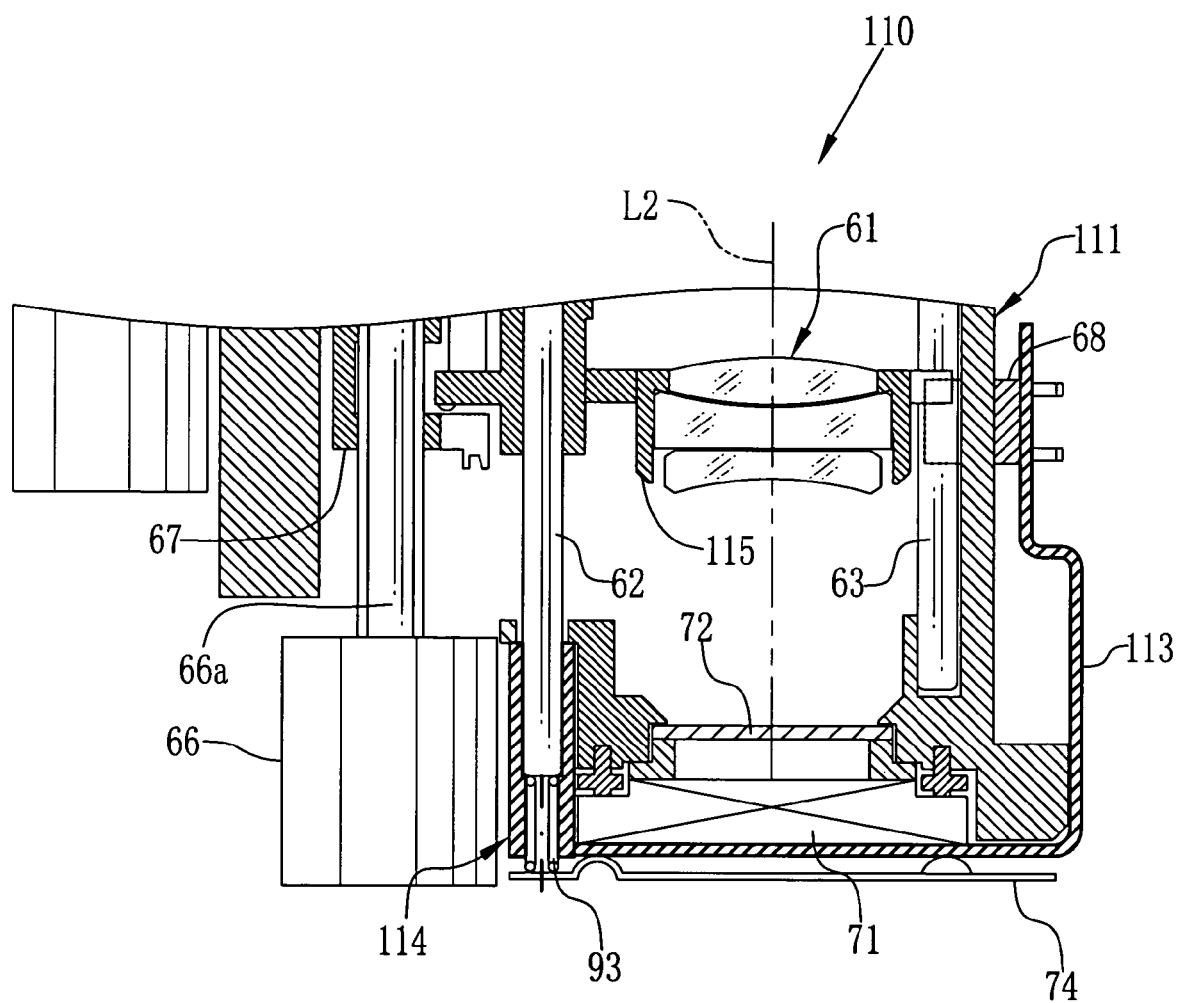
FIG. 9 is a cross-sectional view illustrating a lens barrel according to another embodiment viewed from the front side.

Although the supporting plate 85 for supporting the PI 68 is integrally formed with the adjusting lever 80 in the above embodiment, it is also possible to use a lens barrel 110 shown in FIG. 9. In the lens barrel 110, the PI 68 is disposed in the right side of a lower barrel 111. The PI 68 is supported by a supporting plate 113 fixed to an adjusting lever 114.

A lens frame 115 for supporting the fourth lens group 60 has a light shielding plate (not shown) formed on the right side thereof. Since the PI 68 moves integrally with the adjusting lever 114, the light shielding plate and the PI 68 do not interfere with each other. Note that other components of the adjusting lever 114 are the same as those of the adjusting lever 80, and thus detail explanations about those components are omitted. In FIG. 9, the components identical to those of the lens barrel 20 have the same numerals and explanations of them are omitted.

Although the opening 82 is formed to be elongated in the longitudinal direction and has the approximately same width as the diameter of the pin body 90a of the adjusting pin 90, the opening 82 can be formed to be a circular opening having a larger diameter than the diameter of the pin body 90a. However, it is preferred to form the opening 82 to be elongated to facilitate the positional adjustment of the guide shaft 62.

In the above embodiment only the guide shaft 62 is provided with the adjusting lever, but it is also possible to provide the adjusting lever for other guide shafts as well.

In addition, the present invention is not limited to the refracting optical system, but applicable to a usual lens barrel which images the subject without refracting the subject light.

Furthermore, the present invention is not limited to a digital camera, but applicable to a digital video camera as the imaging device. Although the lens barrel is used for the imaging device in the above embodiment, the lens barrel of the present invention can be used for optical devices such as a silver halide camera, a projector and the like.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. A lens barrel having a barrel body for containing a lens, and a guide shaft disposed in said barrel body for guiding said lens to move in an optical axis direction, said lens barrel comprising;
    a lever having a lever body and a holding portion, said lever body having an opening and a bearing for supporting one end of said guide shaft, said holding portion extended from near said opening to outside said barrel body, a length between an edge of said holding portion and a center of said opening being longer than that between the center of said opening and a center of said bearing; and
    an adjusting pin that is fixed to said barrel body through said opening, said adjusting pin allowing said lever to move in a plane orthogonal to said optical axis when said holding portion being operated from outside of said barrel body to adjust the position of said guide shaft.

2. A lens barrel claimed in claim 1, wherein said opening has a shape elongated along the longitudinal direction of said lever body, whose width is approximately equal to the diameter of said adjusting pin.

3. A lens barrel claimed in claim 2, wherein a cutout is formed on said holding portion such that said holding portion is easily broken off on said cutout after the position of said guide shaft is adjusted.

4. A lens barrel claimed in claim 3, wherein a thread portion is formed at the top of said adjusting pin such that said adjusting pin is threaded in a screw hole formed on said barrel body.

5. A lens barrel claimed in claim 4, wherein a flange portion is formed on said adjusting pin between said thread portion and a head of said adjusting pin, said lever being biased toward said barrel body by a spring provided between said flange portion and said lever.

6. A lens barrel claimed in claim 5, further comprising:
    a detecting device for optically detecting the position of said lens in said optical axis direction, said detecting device being supported by said lever directly or indirectly.

7. An imaging device comprising:
    a barrel body for containing a lens;
    a guide shaft disposed in said barrel body for guiding said lens to move in an optical axis direction;

a lever having a lever body and a holding portion, said lever body having an opening and a bearing for supporting one end of said guide shaft, said holding portion extended from near said opening to outside said barrel body, a length between an edge of said holding portion and a center of said opening being longer than that between the center of said opening and a center of said bearing;

an adjusting pin that is fixed to said barrel body through said opening, said adjusting pin allowing said lever to move in a plane orthogonal to said optical axis when said holding portion being operated from outside of said barrel body to adjust the position of said guide shaft; and an imaging element for converting an image formed with said lens into an electric signal.

8. An imaging device claimed in claim 7, further comprising:

a fixing member for fixing said imaging element to said barrel body, said fixing member being supported by said adjusting pin.

9. An optical device comprising:

a barrel body for containing a lens;

a guide shaft disposed in said barrel body for guiding said lens to move in an optical axis direction;

a lever having a lever body and a holding portion, said lever body having an opening and a bearing for supporting one end of said guide shaft, said holding portion extended from near said opening to outside said barrel body, a length between an edge of said holding portion and a center of said opening being longer than that between the center of said opening and a center of said bearing; and an adjusting pin that is fixed to said barrel body through said opening, said adjusting pin allowing said lever to move in a plane orthogonal to said optical axis when said holding portion being operated from outside of said barrel body to adjust the position of said guide shaft.

* * * * *